US012502395B2

United States Patent
Blithe et al.

(10) Patent No.: US 12,502,395 B2
(45) Date of Patent: Dec. 23, 2025

(54) PROGESTIN/TESTOSTERONE TRANSDERMAL GEL

(71) Applicants: The Population Council, Inc., New York, NY (US); The United States of America, as rep'd by the Secy., Dept. of Health and Human Services, Bethesda, MD (US)

(72) Inventors: Diana L. Blithe, Silver Spring, MD (US); Min S. Lee, San Diego, CA (US); Regine Sitruk-Ware, Paris (FR)

(73) Assignees: The Population Council, Inc., New York, NY (US); The United States of America, as rep'd by the Secy., Dept. of Health and Human Services, Bethesda, MD (US)

( * ) Notice: Subject to any disclaimer, the term of this patent is extended or adjusted under 35 U.S.C. 154(b) by 0 days.

(21) Appl. No.: 18/941,896

(22) Filed: Nov. 8, 2024

(65) Prior Publication Data

US 2025/0064832 A1   Feb. 27, 2025

Related U.S. Application Data

(63) Continuation of application No. PCT/US2023/021154, filed on May 5, 2023.

(60) Provisional application No. 63/339,563, filed on May 9, 2022.

(51) Int. Cl.
| | |
|---|---|
| *A61K 31/4709* | (2006.01) |
| *A61K 9/00* | (2006.01) |
| *A61K 9/06* | (2006.01) |
| *A61K 31/568* | (2006.01) |
| *A61K 31/57* | (2006.01) |
| *A61K 47/10* | (2017.01) |
| *A61K 47/12* | (2006.01) |
| *A61K 47/14* | (2017.01) |
| *A61P 15/16* | (2006.01) |
| *A61P 17/00* | (2006.01) |
| *A61P 17/04* | (2006.01) |
| *A61P 17/10* | (2006.01) |
| *A61P 31/04* | (2006.01) |

(52) U.S. Cl.
CPC .......... *A61K 31/568* (2013.01); *A61K 9/0014* (2013.01); *A61K 9/06* (2013.01); *A61K 31/57* (2013.01); *A61K 47/10* (2013.01); *A61K 47/14* (2013.01); *A61P 15/16* (2018.01)

(58) Field of Classification Search
None
See application file for complete search history.

(56) References Cited

U.S. PATENT DOCUMENTS

2005/0020552 A1   1/2005   Aschkenasy et al.

FOREIGN PATENT DOCUMENTS

WO         03/028667 A2    4/2003

OTHER PUBLICATIONS

Patel et al. (World J Mens Health. Jan. 2019;37(1):45-54. Published online Oct. 10, 2018. https://doi.org/10.5534/wjmh.180036).*
Anawalt B D et al; "Combined nestorone-testosterone gel suppresses serum gonadotropins to concentrations associated with effective hormonal contraception in men", Andrology, Scriptor Publisher APS, Hoboken, USA, vol. 7, No. 6, Apr. 10, 2019 (Apr. 10, 2019) pp. 878-887, XP072450764, ISSN: 2047-2919, DOI; 10.1111/ANDR.12603 cited in the application p. 879 11study medication.
FDA, Androgel 1.62% label. Oct. 2016. 31 pgs.
Ilani, Niloufar et al. "A new combination of testosterone and nestorone transdermal gels for male hormonal contraception." The Journal of clinical endocrinology and metabolism.vol. 97,10 (2012): 3476-86. doi: 10.1210/jc.2012-1384.
International Search Report and Written Opinion issued in Appln. No. PCT/US2023/021154 mailed Aug. 4, 2023 (15 pages).
Mahabadi Vahid et al: "Combined Transdermal Testosterone Gel and the Progestin Nestorone Suppresses Serum Gonadotropins in Men", Journal of Clinical Endocrinology and Metabolism, vol. 94, No. 7, Jul. 1, 2009 (Jul. 1, 2009), pp. 2313-2320, XP93067713, US ISSN: 0021-972X, DOI: 10.1210/jc.2008-2604.
Roth, M Y et al., "Characteristics associated with suppression of spermatogenesis in a male hormonal contraceptive trial using testosterone and Nestorone(®) gels." Andrology, vol. 1,6 (2013): 899-905. doi:10.1111/ j.2047-2927.2013.00135.x.
World Health Organization Task Force on Methods for the Regulation of Male Fertility. "Contraceptivetestosterone-induced azoospermia and oligozoospermia in normal men." Fertility and sterility 821-9.

* cited by examiner

*Primary Examiner* — Layla Soroush
(74) *Attorney, Agent, or Firm* — Lerner David LLP

(57) ABSTRACT

The present disclosure relates to a specific combination of a progestin and testosterone in a transdermal composition and usage thereof in a method for ensuring male contraception with more efficacy and less side effects.

10 Claims, 1 Drawing Sheet

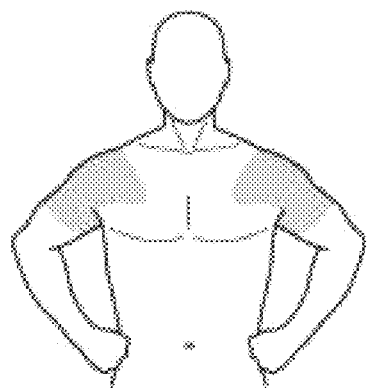

PROGESTIN/TESTOSTERONE TRANSDERMAL GEL

CROSS REFERENCE TO RELATED APPLICATIONS

The present application is a bypass continuation of International Application No. PCT/US2023/021154 filed on May 5, 2023, which claims priority from U.S. Provisional Patent Application No. 63/339,563 filed on May 9, 2022, all the disclosures of which are incorporated herein by reference.

This invention was made with government support under HHSN275201300024I and HHSN275201500002I/HHSN275000010 awarded by the National Institutes of Health (NIH). The government has certain rights in the invention.

FIELD OF THE INVENTION

The present disclosure relates to a specific combination of a progestin and testosterone in a transdermal composition for use in a method for ensuring male contraception with additional health benefits.

BACKGROUND OF THE INVENTION

Approximately 45% of pregnancies worldwide are unintended, which contribute to undesirable health problems including maternal morbidity and mortality, and significant societal burden. Despite many contraceptive methods are available for women, male contraceptive methods are limited to withdrawal, condom, and vasectomy. Condom suffers from inconsistent uses and typical use failure rate of 13%, whereas vasectomy requires surgery and is not easily and reliably reversible.

Several reversible male hormonal contraceptive regimens have been tested in clinical studies, using either testosterone alone or testosterone in combination with a progestin.

Testosterone (referred to throughout the present disclosure as T) is the male sex hormone that is made in the testicles. It plays vital roles in the development of male genitalia in utero and during puberty. Testosterone hormone levels are important to normal male sexual development and functions. It has been found that exogenous testosterone can be used in testosterone replacement therapy to treat symptoms of hypogonadism such as decreased libido, depressed mood and erectile dysfunction. For example, AndroGel® (an FDA-approved testosterone gel formulation) 1.62% is a prescription topical medicine used to treat the symptoms of testosterone deficiency. The dose can be adjusted between a minimum of 20.25 mg of testosterone (one pump actuation or a single 20.25 mg packet) and a maximum of 81 mg of testosterone (four pump actuations or four 20.25 mg packets). The dose should be titrated based on the pre-dose morning serum testosterone concentration at approximately 14 days and 28 days after starting treatment or following dose adjustment. Additionally, serum testosterone concentration should be assessed periodically thereafter, serum T levels should remain between 350 ng/dL and 750 ng/dL. Testosterone when used at pharmacological high doses has been found to cause diminished sperm production because of its inhibition of gonadotropin-releasing hormone (GnRH) production, which in turn inhibits luteinizing hormone (LH) production and decreases endogenous testosterone production by the Leydig cells that causes the decrease of intratesticular testosterone concentration. Inhibiting GnRH production also inhibits follicle stimulating hormone (FSH) release, which regulates spermatogenesis in the Sertoli cells. Spermatogenesis, assessed by seminal fluid sperm concentration, usually is used as a primary outcome for evaluating effectiveness of the male contraceptive. When the sperm concentration is less than 1 million spermatozoa/mL seminal fluid, the male contraceptive regimen is considered as being effective at preventing pregnancy. See Contraceptive efficacy of testosterone-induced azoospermia and oligozoospermia in normal men, World Health Organization Task Force on Methods for the Regulation of Male Fertility, Fertil Steril., 1996 April; 65 (4): 821-9.

Studies showed that weekly intramuscular injection of 200 mg/week of testosterone enanthate, a high pharmacological dose of a testosterone ester, for 12 months proved to be a highly effective contraceptive, with only 0.8 pregnancy per 100 person-years of exposure.

Progestins are synthetic progestogens most frequently used for female hormonal contraception, as well as to prevent endometrial hyperplasia from unopposed estrogen in hormone replacement therapy. The compound named 16-methylene-17α-acetoxy-19-norpregn-4-ene-3,20-dione, or segesterone acetate, is a progestin (also identified by the trade name NESTORONE® and referred to throughout the present disclosure as NES) comprising a 19-nor-progesterone derivative, with a structure close to the physiological hormone progesterone. NES has strong antiovulatory and progestational properties, and does not carry androgenic, estrogenic, or glucocorticoid actions at up to x2000 the therapeutic levels. Given its high anti-ovulatory potency when given systemically, only very low doses of NES are believed to be required for contraceptive efficacy and hence can be used in various non-oral delivery systems. NES has been studied extensively in non-oral forms, including transdermal gels, implants, and vaginal rings for female contraception. It has been approved by the FDA in a first formulation as a vaginal system for female contraception, in combination with an estrogen.

In men, studies showed that the addition of a progestin to T increases the rate and extent of the suppression of spermatogenesis. For example, Mahabadi et al. in "Combined Transdermal Testosterone Gel and the Progestin Nestorone Suppresses Serum Gonadotropins in Men," J. Clin. Endocrinol Metab., July 2009, 94 (7), 2313-2320, disclosed that combined transdermal NES gel (containing 6 or 8 mg/day of NES) and T gel (10 g/day of Testogel® 1%, containing 100 mg/day of T) in a course of 20-day treatment with delivering 600 or 800 μg/day of NES and 10 mg/day of T to the body (approximately 10% of the dose of the steroid applied on the skin was absorbed) suppressed serum gonadotropins to 0.5 IU/liter or less in significantly more men than either gel alone. However, acne was reported in 10% of the subjects, and a decrease in HDL cholesterol levels occurred in all T (100 mg/d alone or in combination with NES) gel treatment groups, than in NES-alone groups, suggesting that the decrease is likely secondary to the T administration. Large inter-individual variations in serum total and free T concentrations were observed in all T gel treatment groups, and high serum T levels were observed above the normal range in some subjects. Mahabadi et al. suggested that a lower dose of T might be necessary to avoid high serum T levels and decrease in HDL cholesterol levels. Serum gonadotropins in Mahabadi's study was used as a surrogate marker of suppression of spermatogenesis, and it was assumed that when it is 1.0 IU/liter or less, the male contraceptive regimen is considered as being effective at preventing pregnancy.

Ilani et al. later in "A New Combination of Testosterone and Nestorone Transdermal Gels for Male Hormonal Contraception," J. Clin. Endocrinol Metab., October r 2012, 97 (10), 3476-3486, disclosed that a daily treatment of combined NES gel (containing 8 or 12 mg/day of NES) and T gel (10 g/day of Testogel® 1%, containing 100 mg/day of T) for at least 20 weeks, delivering 800 or 1,200 µg/day of NES and 10 mg/day of T to the body (approximately 10% of the dose of the steroid applied on the skin was absorbed) suppressed sperm concentration to 1 million/mL or less in significantly more men than T gel alone. Serum T levels showed large variations within and between subjects. T concentrations were above 1,800 ng/dl on more than two occasions in three subjects. Further, acne was the most common adverse event, and was shown in 21% of subjects.

In order to predict who will respond to the NES/T gel hormonal contraceptive method, Roth et al. in "Characteristics associated with suppression of spermatogenesis in a male hormonal contraceptive trial using testosterone and NESTORONE® gels," Andrology, 2013 Nov. 1 (6), 899-905, analyzed data from the studies in Ilani's paper. They concluded that serum NESTORONE® concentrations were significantly associated with suppression of spermatogenesis, whereas serum T concentrations were not.

Anawalt et al. further in "Combined nestorone-testosterone gel suppresses serum gonadotropins to concentrations associated with effective hormonal contraception in men," Andrology, 2019 Nov. 7 (6), 878-887, disclosed that daily application of a single gel formulation containing 8.3 mg NES/62.5 mg T in a 5 mL gel in a 28-day course of treatment suppressed FSH and LH concentrations to ≤1.0 IU/L in significantly more men, compared to daily application of 62.7 mg T in a 4.4 mL gel. Although the mean serum total T concentration (T $C_{avg}$) in the NES-T group remained within the normal physiologic range (300-1,000 ng/dL) for the entire treatment period, the maximum serum total T concentration (T $C_{max}$) were above normal physiologic range after Day 2. Again, in Anawalt's study, serum gonadotropins were used as a surrogate marker of suppression of spermatogenesis. However, Anawalt does not show any study of the combined 8.3 mg NES/62.5 mg T gel in suppressing sperm concentration.

There is a need in developing a safe, effective, and reversible male contraceptive method that is convenient to apply. This requires an approach to find a formulation that reduces sperm count while maintaining testosterone levels in the normal range.

SUMMARY OF THE INVENTION

The present disclosure provides a transdermal composition in a unit dose form for contraceptive treatment of males, comprising a 16-methylene-17α-acetoxy-19-norpregn-4-ene-3,20-dione in an amount of about 7 mg to about 12 mg, testosterone in an amount of about 60 mg to about 100 mg, and a pharmaceutical acceptable excipient.

The transdermal composition in a unit dose form may comprise 16-methylene-17α-acetoxy-19-norpregn-4-ene-3,20-dione in an amount of about 8 mg to about 10 mg, and testosterone in an amount of about 70 mg to about 85 mg.

The transdermal composition in a unit dose form may comprise 16-methylene-17α-acetoxy-19-norpregn-4-ene-3,20-dione in an amount of about 8 mg to about 8.5 mg, and testosterone in an amount of about 73.5 mg to about 74.5 mg.

The transdermal composition in a unit dose form may comprise 16-methylene-17α-acetoxy-19-norpregn-4-ene-3,20-dione in an amount of about 8.3 mg, and testosterone in an amount of about 73.8 mg.

The transdermal composition in a unit dose form may be in a gel form.

The transdermal composition in a unit dose form may be in a form of a hydroalcoholic gel comprising a $C_2$ to $C_4$ alcohol.

The transdermal composition in a unit dose form may comprise ethanol.

The transdermal composition in a unit dose form may comprise a $C_2$ to $C_4$ alcohol in an amount of 50% to 85% wt/wt.

The transdermal composition in a unit dose form may further comprise a penetration enhancer.

The transdermal composition in a unit dose form may further comprise a penetration enhancer, which is isopropyl myristate.

The present disclosure also provides a method for contraceptive treatment of males, comprising applying to a male body surface a transdermal composition in a unit dose form disclosed herein.

The transdermal composition in a unit dose form may be applied to the male body surface once a day.

The transdermal composition in a unit dose form may be applied to a surface on an upper arm or a shoulder.

BRIEF DESCRIPTION OF THE DRAWINGS

The nature and details of the present disclosure may be more fully appreciated with reference to the following Detailed Description, which in turn refers to the Figure, as follows:

The FIGURE shows the gel application sites on a male subject.

DETAILED DESCRIPTION

Before describing at least one embodiment of the invention in detail, it is to be understood that the invention is not limited in its application to the details set forth in the following description or exemplified by the examples. The invention is capable of other embodiments or of being practiced or carried out in various ways. It is therefore to be understood that numerous modifications may be made to the illustrative embodiments and that other arrangements may be devised without departing from the spirit and scope of the present disclosure. It is also to be understood that the phrasing and terminology employed herein is for the purpose of description and should not be regarded as limiting.

All percentages and ratios used herein are by weight of the total composition unless otherwise indicated herein. All measurements made herein are at 25° C. and normal pressure unless otherwise designated. All temperatures used herein are in Degrees Celsius unless specified otherwise.

The present disclosure can comprise (open ended) or consist essentially of the components as well as other ingredients or elements described herein. As used herein, the term "comprising" means having the elements recited, or their equivalent in structure or function, plus any other element or elements which are not recited. The terms "having" and "including" used herein are also to be construed as open ended unless the context suggests otherwise. The terms "comprising," "having" and "including" encompass the terms "consisting of" and "consisting essentially of." The term "consisting essentially of" herein means that the composition or method may include additional ingredients and/or steps, but only if the additional ingredients and/or steps do not materially alter the characteristics of the claimed composition or method.

All ranges recited herein include the endpoints, and those falling between. Terms such as "about," "generally," "substantially" and the like are to be construed as modifying a term or value such that it is not an absolute, but does not read on the prior art. Such terms are defined by the circumstances and the terms that they modify as those are understood by those of skill in the art. This includes, at very least, the degree of expected experimental error, technique error, and instrument error for a given technique used to measure a value. Unless otherwise indicated, the term "about" as used herein includes all values in a range of the specific value indicated+10%.

Unless otherwise indicated, as used herein, the terms "a" and "an" include the plural, such that, e.g., "an excipient" can mean at least one excipient, as well as a plurality of excipients including but not limited to, excipients of different types.

Where used herein, the term "and/or" when used in a list of two or more items means that any one of the listed characteristics can be present, or any combination of two or of the listed characteristics can be present. For more example, if a composition is described as comprising agents A, B, and/or C, the composition can comprise A alone; B alone; C alone; A and B in combination; A and C in combination; B and C in combination; or A, B, and C in combination.

As used the term "contraceptive agent" refers to medications administered in order to prevent or reduce the likelihood of pregnancy. An "contraceptive agent" disclosed herein may refer to one contraceptive agent, or a combination of two or more contraceptive agents.

The term contraceptive "treatment," or "therapy" as used herein refers to the administration of the present composition in order to achieve prevention or reduction the likelihood of pregnancy.

The use of the term "transdermal" or "topical" in accordance with this disclosure is meant to include both transdermal (or percutaneous) administration, i.e., delivery by passage of active agents and other drug compositions through the skin tissue, by means of gels, creams, ointments, pastes, foams, swabs, pledgets, pads, lotions, sprays, aerosols, patches, and the like, into the bloodstream.

Transdermal delivery of active agents provides many advantages over conventional oral administration. Advantages of transdermal systems include bypassing the portal circulation, thereby eliminating first-pass metabolism in the liver, convenience, non-interrupted therapy, improved patient compliance, reversibility of treatment (by removal of the transdermal system from the skin), and delivery of medication directly into the system circulation at a constant rate, and prolonged half-life given the skin reservoir effect.

One method for transdermal delivery involves the use of a patch, which relies on diffusion of active agents through a membrane. A number of transdermal patch delivery systems are known, all of which include at least one adhesive layer for attaching the patch to the target site.

A gel formulation used herein refers to a form of composition which can be used to topically administer the agents in a consistent manner which facilitates the delivery of the composition with minimal leakage upon delivery. Gel that is easy to apply should not be too runny, greasy, or otherwise inconvenient to use by the patient. Hydrogels are macromolecular networks that absorb water and swell, but do not dissolve in water, due to the presence of both hydrophilic functional groups that provide for water absorption, and crosslinked polymers that give rise to aqueous insolubility. Aqueous-alcoholic gels (also referred to herein interchangeably as hydroalcoholic gels) are hydrogels having a high alcohol concentration. These gels have the advantage of ease of administration. At the application site, the alcohol serves as the vector or enhancer to allow skin penetration and then evaporates, and it is believed that the drug becomes supersaturated. The skin functions as a reservoir for the drug, which is delivered to the systemic blood circulation at a relatively constant rate and during a period lasting several hours.

The term "active," "pharmacologically active," "therapeutically active," "pharmaceutically active" or "physiologically active" to describe "ingredient" or "agent" as used herein means any chemical material or compound used alone or in combination suitable for administration, for example, transdermal administration, which induces a desired systemic effect.

The term "effective," "pharmacologically effective," "therapeutically effective," "pharmaceutically effective" or "physiologically effective" amount of an active agent as used herein means a non-toxic but sufficient amount of a compound used alone or in combination with one or more other compounds to provide the desired therapeutic effect.

The "synergy", term "synergism", "synergistic effect" or "synergistic action" as used herein means an effect of the interaction of the actions of two agents such that the result of the combined action is greater than expected as a simple additive combination of the two agents acting separately.

As understood by one of skill in the art, the effective amount of a contraceptive agent, or the actual weight percentage of such agent used in the composition, can vary depending upon variety of factors, including for example, the actual contraceptive activity of each agent in the composition towards the target to be treated, the synergistic effect of the combination of two or more such agents, the formulation of the composition, and the manner of delivery of the composition. Other factors for consideration in determining a dosage amount of an active contraceptive agent are familiar to one of skill in the art and include the actual dosage form and manner of delivery of the composition, e.g., whether the dosage form is intended for extended release. Such activity can be determined according to conventional methods and the amounts of active agents formulated accordingly.

The term "unit dose form" used herein refers to a composition in a form that is administered to a subject in a single dose.

The term "daily dosage" used herein refers to the daily dosage of any active agents used alone or in combination in the composition to provide the desired therapeutic effect.

The term "pharmaceutically acceptable excipient" used herein refers to carriers or vehicles, gel forming agents or thickening suspending agents, agents, emollients, moisturizers, solubilizers, stabilizers, PH adjusters, penetration enhancers, and preservatives, which do not cause significant irritation to an organism and do not abrogate the biological activity and properties of the applied active agent.

The term "carriers" or "vehicles" used herein refers to carrier materials suitable for transdermal administration and includes any such material known in the art, e.g., any liquid, gel, solvent, liquid diluent, solubilizer or the like, which is non-toxic and which does not interact with other components of the composition in a deleterious manner. Examples of suitable carriers include water, alcohols, mineral oil, silicone, liquid sugars, waxes, petroleum jelly, and a variety of other oils and polymeric materials.

The term "penetration enhancer" used herein refers to a material that helps increase the permeability of skin to a pharmacologically active agent, so as to increase the rate at which the pharmacologically active agent permeates through the skin and enters the bloodstream.

NESTORONE®, referred to throughout the present disclosure as NES, is a progestin, a synthetic 19-nor-progesterone derivative. It is 16-methylene-17α-acetoxy-19-nor-pregn-4-ene-3,20-dione, having a structure close to the physiological hormone progesterone. NES has strong antiovulatory, anti-gonadotropic and progestational properties, and does not carry androgenic, estrogenic, or glucocorticoid actions at therapeutic levels.

Testosterone, referred to throughout the present disclosure as T, is the male sex hormone that is made in the testicles. It has been approved as a replacement therapy and marketed in a gel form (e.g., AndroGel®) for treating the symptoms of testosterone deficiency. The term "testosterone" as used herein refers not only to testosterone itself, but also to its enantiomers, isomers, tautomers, salts, chelates, esters, amides, derivatives, and pro-drugs and precursors thereof, e.g., DHT (dihydrotestosterone), 17-methyltestosterone, 17[alpha]-methyl-testosterone 3-cyclopentyl enol ether, testosterone enanthate, testosterone cypionate, testosterone undecanoate, testosterone cyclodextrin, testosterone buciclate. According to the present disclosure, testosterone can be of natural origin, or result from a hemisynthesis or synthesis process.

According to one aspect to the present disclosure, it is provided a transdermal composition for contraceptive treatment of males, and the composition may comprise a combination of NES and T each in a pharmaceutically effective amount, and a pharmaceutically acceptable excipient.

The composition may comprise NES and T in about 0.1% to 0.3% w/w and about 1.0% to 2.5% wt/wt, preferably about 0.15% to 0.25% w/w and about 1.4% to 2% wt/wt, and more preferably about 0.19% wt/wt and about 1.697% wt/wt, respectively.

In one embodiment, the composition is in a unit dose form, which may comprise at least about 7 mg and up to about 12 mg of NES and at least about 60 mg and up to about 100 mg of T. The levels of these hormones applied onto the skin result in approximately 10% absorption, and thus correspond to an absorption rate of about 700-1,200 µg/day of NES and about 6-10 mg/day of T to the subject for a once-a-day application of such a composition. In another embodiment, the composition is in a unit dose form, which may comprise at least about 7 mg and up to about 10 mg of NES and at least about 60 mg and up to about 95 mg of T. The levels of these hormones applied onto the skin result in approximately 10% absorption, and thus correspond to an absorption rate of about 700-1,000 µg/day of NES and about 6-9.5 mg/day of T to the subject for a once-a-day application of a composition. Preferably, the composition in a unit form may comprise at least about 8 mg and up to about 10 mg of NES and at least about 70 mg and up to about 85 mg of T, which when applied onto the skin results an absorption rate of about 800-1,000 µg/day of NES and about 7-8.5 mg/day of T to the subject for a once-a-day application of such a composition. More preferably, the composition in a unit form may comprise about 8 to 8.5 mg of NES and about 73.5 to 74.5 mg of T, which when applied onto the skin results an absorption rate of about 800-850 µg/day of NES and about 7.35-7.45 mg/day of T to the subject for a once-a-day application of such a composition. In one embodiment, the composition in a unit form may comprise about 8.3 mg of NES and about 73.8 mg of T. Expressed in a different manner, it would also be possible to equate these levels of absorption of these hormones to corresponding plasma levels in the patient. In this regard, the amounts of these hormones required for the transdermal formulation of this disclosure generally result in plasma levels for NES of at least about 600 and up to about 800 pmol/L and for T at least about 300 up to about 1000 ng/dl, preferably 300 to 900 ng/dL.

It has been found that this composition system when used in a transdermal manner not only exerted effective suppression of gonadotropins and sperm concentrations, but also achieved such effective suppression of sperm concentration in a short period of treatment. Further, such composition caused little side effects.

The transdermal application of this composition with the combination of NES and T, as noted above, is preferably applied in the form of a gel. In particular, the gel may be clear, water-washable, cool to the touch, quick drying, spreadable, and/or non-greasy formulations. More preferably, the present transdermal composition is formulated as an aqueous gel, and most preferably as a hydroalcoholic gel.

In particular, the transdermal composition, preferably in a gel form, may further comprise a pharmaceutically acceptable excipient including, but not limited to, a carrier, a gel forming agent, an emollient, a moisturizer, and a PH adjuster.

A carrier, or alternatively a vehicle, in the transdermal composition may include, but not limited to, water, alcohols, mineral oil, silicone, liquid sugars, waxes, petroleum jelly, and mixtures thereof. The carrier may be present from about 90% to 99% wt/wt, preferably from about 94% to 98% wt/wt, or from about 95% to 97% wt/wt, and more preferably from about 96% to 96.5% of the composition depending on the type of carriers used. Preferably, the carrier in the present transdermal composition may include water and a $C_o$ to $C_4$ alcohol. Water may be present from about 20% to 40% w/w, preferably from about 25% to 32% wt/wt, or from about 27% to 29%, and more preferably from about 28.0% to 28.5% w/w of the composition. The $C_0$ to $C_4$ alcohol may also function here as a penetration enhancer, and preferably is ethanol, isopropanol, n-propanol, or mixtures thereof, and more preferably is ethanol. The $C_o$ to $C_4$ alcohol may be present from about 50% to 85% wt/wt, or 52% to 83% wt/wt, preferably from about 62% to 73% wt/wt, from about 65% to 71% wt/wt, from about 66.5% to 69.5% wt/wt, or from about 67.5% to 68.5 wt/wt, and more preferably around about 67.9% wt/wt of the composition. The $C_o$ to $C_4$ alcohol is preferably ethanol. Ethanol may be present from about 50% to 85% wt/wt, preferably from about 65% to 71% wt/wt, and more preferably at about 67.93% wt/wt of the composition.

A gel forming agent, or alternatively a thickening agent, may be present in an amount sufficient to alter the viscosity of the composition. A gel forming agent can be selected from the group including: carbomer; carboxyethylene or polyacrylic acid such as Carbopol 980 USP/NF/EP, or 940 NF, 981 or 941 NF, 1382 or 1342 NF, 5984 or 934 NF, ETD 2020, 2050, 934P NF, 971P NF, 974P NF, and Noveon AA-1 USP; cellulose derivatives such as ethylcellulose, hydroxypropylmethylcellulose (HPMC), (EHEC), carboxymethylcellulose ethylhydroxyethylcellulose (CMC), hydroxypropylcellulose (HPC) (Klucel different grades), hydroxyethylcellulose (HEC) (Natrosol grades), HPMCP 55, and Methocel grades; natural gums such as arabic, xanthan, guar gums, and alginates; polyvinylpyrrolidone derivatives such as Kollidon grades; polyoxyethylene polyoxypropylene copolymers such as Lutrol F grades 68, and 127; and mixtures thereof. Other gel forming agents may include chitosan, polyvinyl alcohols, pectins, and veegum grades. A tertiary amine, such as triethanolamine or trolamine, may also be included to thicken and neutralize the system.

A polymer or copolymer of acrylic acid, such as a carbomer acts as a gel forming agent and facilitates the release of lipophilic active agent and penetration enhancer. Preferably, the gel forming agent is Lutrol F grades and Carbopol grades.

The amount and the type of the gel forming agent in the transdermal composition may be selected to provide the desired product consistency and/or viscosity to facilitate application to the skin. The gel forming agent may be present from about 0.2% to 3.0% wt/wt of the composition depending on the type of gel forming agent used. For example, the gel forming agent may be preferably present in an amount between about 0.5% and 2% wt/wt and more preferably at about 1.0% wt/wt for polyacrylic acids.

An emollient, a moisturizer, in the and/or transdermal composition may be used to enhance penetration (thus functioning as a penetration enhancer), soften and smooth the skin, or to hold and retain moisture. It includes, but not limited to, isopropyl myristate, cetyl alcohol, cetearyl alcohol, cocoa butter, isopropyl palmitate, lanolin, liquid paraffin, polyethylene glycols, shea butter, silicone oils, stearic acid, stearyl alcohol, castor oil, and mixtures thereof, as well as other oils. The emollient/moisturizer may be present from about 0.2% to 4.0% wt/wt, preferably from about 0.5% to 3.0% wt/wt of the composition depending on the type of emollient/moisturizer used. Preferably, the emollient/moisturizer in the present transdermal composition may include isopropyl myristate, which may be present from about 0.2% to 3.0% wt/wt, preferably from about 0.5% to 2.0% wt/wt, and more preferably around 1.0% wt/wt of the composition.

A pH adjuster, or alternatively a pH regulator, in the transdermal composition may be used to maintain the desired pH for the proper chemical and physical properties. It may include, but not limited to, an acid and a solution thereof such as a hydroxy acid such as lactic acid, and tartric acid, a base and a solution thereof such as sodium hydroxide, calcium hydroxide, potassium hydroxide, ammonium hydroxide, and a ternary amine and a solution thereof such as triethanolamine, tromethamine, and tetrahydroxypropylethylendiamine, and a buffer and a solution thereof such as carbonate buffers, citrate buffers, phosphate buffers, and acetate buffers, tris buffers, or a combination thereof.

The present transdermal composition is preferably formulated so as to have a pH value of about 3 to 9, preferably a pH value of about 4 to 8, or about 5 to 7, and more preferably a pH value of about 5.7. Sodium hydroxide is preferably used in the present transdermal composition as a pH adjuster and may be present from about 0.01% to 0.4% wt/wt, preferably from about 0.015% to 0.03% wt/wt, and more preferably around 0.028% wt/wt of the composition.

The transdermal composition may further comprise an additional penetration enhancer. The additional penetration enhancer may include, but not limited to, a glycol, a monoalkyl ether of diethylene glycol, a fatty alcohol, acetone, acyl lactylates, acyl peptides, acylsarcosinates, alkanolamine salts of fatty acids, alkyl benzene sulphonates, alkyl ether sulphates, alkyl sulphates, anionic surfatactive agents, benzyl benzoate, benzyl salicylate, butan-1,4diol, butyl benzoate, butyl laurate, butyl myristate, butyl stearate, cationic surface-active agents, citric acid, cocoamidopropylbetaine, decyl methyl sulfoxide, decyl oleate, dibutyl azelate, dibutyl phthalate, dibenzyl sebacate, dibutyl sebacate, dibutyl suberate, dibutyl succinate, dicapryl adipate, didecyl phthalate, diethylene glycol, diethyl sebacate, diethyl-m-toluamide, di(2-hydroxypropyl) ether, diisopropyl adipate, diisopropyl sebacate, N, N-dimethyl acetamide, dimethyl azelate, N, N-dimethyl formamide, 1,5-dimethyl-2-pyrrolidone, dimethyl sebacate, dimethyl sulphoxide, dioctyl adipate, dioctyl azelate, dioctyl sebacate, 1,4 dioxane, 1-dodecylazacyloheptan-20ne, dodecyl dimethyl amine oxides, ethyl caprate, ethyl caproate, ethyl caprylate, 2-dehyl-hexyl pelargonate, ethyl-2-hydroxypropanoate, ethyl laurate, ethyl myristate, 1-ethyl-2-pyrrolidone, ethyl salicylate, hexyl laurte, 2-hydroxyoctanoic acid, 2-hydroxypropanoic acid, 2-hydroxypropionic acid, isethionates, isopropyl isostearate, isopropyl palritate, guar hydroxypropyltrimonium chloride, hexan-2, 5-diol, kheliin, lamepons, lauryl alcohol, maypons, metal salts of fatty acids, methyl nicotinate, 2-methyl propan-2-ol, 1-methyl-2-pyrrolidone, 5-methyl-2-pyrrolidone, methyl taurides, miranol, nonionic surface-active agents, octyl alcohol, octylphenoxy polyethoxyethanol, oleic ethanolamide, pleyl alcohol, pentan-2,4-diol, phenoxyethanol, phosphatidyl choline, phosphine oxides, polyalkoxylated ether glycollates, poly(diallylpiperidinium chloride), poly(dipropyl-diallylammonium chloride), polyglycerol esters, polyoxyethylene lauryl ether, polyoxy: polyoxyethylene stearate, polyoxypropylene 15 stearyl ether, poly(vinyl pyridinium chloride), propan-1-ol, propan-2-ol, propylene glycol dipelargonate, pyroglutamic acids, 2-pyrrolidone, pyruvic acids, Quaternium 5, Quaternium 18, Quaternium 19, Quaternium 23, Quaternium 31, Quaternium 40, Quaternium 57, quartenary amine salts, quaternised poly(dimethylaminoethylmethacrylate), quaternised poly(vinyl alcohol), sapamin hydrochloride, sodium cocaminopropionate, sodium dioctyl sulphonsuccinate, sodium laurate, sodium lauryl ether sulphate, sodium lauryl sulphate, sugar esters, sulphosuccinate, tetrahydrofuran, tetrahydrofurfural alcohol, transcutol, triethanolamine dodecyl benzene sulphonate, triethanolamine oleate, urea and a derivative thereof, and mixtures thereof. In addition to a $C_2$-$C_4$ alcohol, preferably ethanol, an emollient and/or a moisturizer as a penetration enhancer mentioned above, the additional penetration enhancers may be optionally present in the composition from about 0.2% to 3.0% wt/wt, preferably from about 0.5% to 2.0% wt/wt of the composition depending on the type of penetration enhancer used.

The composition may further include one or more additives including, but not limited to, humectants, deodorant agents, antiperspirants, preservatives, antioxidants emulsifiers, occlusive solubilizing agents, agents, and surfactants. The additive may be present from about 0% to 10% wt/wt %, preferably from about 0% to 5% wt/wt of the composition. The type and amount of the additive can be determined by one of skill in the art using conventional methods.

Suitable humectants that can be used in the context of the present composition include, without limitation, glycerin, propylene, glycol, sorbitol, and triacetin.

Representative examples of deodorant agents that are usable in the context of the present composition include, without limitation, quarternary ammonium compounds such as cetyl-trimethylammonium bromide, cetyl pyridinium chloride, benzethonium chloride, diisobutyl phenoxy ethoxy ethyl dimethyl benzyl ammonium chloride, sodium N-lauryl sarcosine, sodium N-palmithyl sarcosine, lauroyl satcosine, N-myristoyl glycine, potassium N-lauryl sarcosine, stearyl, trimethyl ammonium chloride, sodium aluminum chlorohydroxy lactate, tricetylmethyl ammonium chloride, 2,4,4'-trichloro-2'-hydroxy diphenyl ether, diaminoalkyl amides such as L-lysine hexadecyl amide, heavy metal salts of citrate, salicylate, and piroctose, especially zinc salts, and acids thereof, heavy metal salts of pyrithione, especially zinc pyrithione and zinc phenolsulfate. Other deodorant agents include, without limitation, odor absorbing materials such as carbonate and bicarbonate salts, e.g., as the alkali metal carbonates and bicarbonates, ammonium and tetraalkylammonium carbonates and bicarbonates, especially the sodium and potassium salts, or any combination of the above.

Antiperspirant agents can be incorporated in the present composition either in a solubilized or a particulate form and include, for example, aluminum or zirconium astringent salts or complexes.

Suitable preservatives that can be used in the context of the present composition include, without limitation, one or more alkanols, disodium EDTA (ethylenediamine tetraacetate), EDTA salts, EDTA fatty acid conjugates, isothiazolinone, parabens such as methylparaben and propylparaben, propylene glycols, sorbates, urea derivatives such as diazolindinyl urea, or any combinations thereof.

Suitable antioxidants that can be used in the context of the present composition include, without limitation, tocopherol and derivatives, ascorbic acid and derivatives, butylated hydroxyanisole, butylated hydroxytoluene, fumaric acid, malic acid, propyl gallate, metabisulfates and derivatives, and mixtures thereof.

Suitable emulsifiers that can be used in the context of the present composition include, without limitation, one or more sorbitans, alkoxylated fatty alcohols, alkylpolyglycosides, soaps, alkyl sulfates, monoalkyl and dialkyl phosphates, alkyl sulphonates, acyl isothionates, or any combinations thereof.

Suitable occlusive agents that can be used in the context of the present composition include, without limitation, petrolatum, mineral oil, beeswax, silicone oil, lanolin and oil-soluble lanolin derivatives, saturated and unsaturated fatty alcohols such as behenyl alcohol, hydrocarbons such as squalane, various animal and vegetable oils such as almond oil, peanut oil, wheat germ oil, linseed oil, jojoba oil, oil of apricot pits, walnuts, palm nuts, pistachio nuts, sesame seeds, rapeseed, cade oil, corn oil, peach pit oil, poppyseed oil, pine oil, castor oil, soybean oil, avocado oil, safflower oil, coconut oil, hazelnut oil, olive oil, grape seed oil and sunflower seed oil.

Representative examples of solubilizing agents that are usable in this context of the present composition include, without limitation, complex-forming solubilizers such as citric acid, ethylenediamine-tetraacetate, sodium meta-phosphate, succinic acid, urea, cyclodextrin, polyvinylpyrrolidone, diethylammonium-ortho-benzoate, and micelle-forming solubilizers such as tweens and spans e.g., TWEEN 80. Other solubilizers that are usable for the compositions of the present disclosure are, for example, polyoxyethylene sorbitan fatty acid ester, polyoxyethylene n-alkyl ethers, n-alkyl amine n-oxides, poloxamers, organic solvents, phospholipids and cyclodextrines.

The composition may further include anionic, non-ionic or cationic surfactants.

The transdermal composition in a unit dose form comprising about 8.3 mg of NES, about 73.8 mg of T, and a pharmaceutically acceptable excipient may have a gel form having a volume of 1-10 mL, preferably 4-8 mL, and more preferably 5 mL. A once-a-day application of such unit dose gel form to a male body surface may provide an absorption rate of about 830 µg/day of NES and 7.38 mg/day of T to the subject.

The male body surface may include, but not limited to, abdomen, armpit, arm, back, thigh, and shoulder preferably upper arm and shoulder.

The gel may be preferably packaged in any suitable container indicating use and from which it can be either extruded or dispensed, such as squeezable tube, syringe, or the like, directly onto the male body surface. The volume of gel so contained is conveniently and preferably selected to constitute predetermined doses, such as a single daily dose, or two or more daily doses, or the like, to facilitate administration of a desired controlled dose. The package can be initially sealed and be opened at the time of use. If more than a single dose is present, the package is preferably resealable by a suitable closure means.

A preferred package is a container, such as canister and the like, fitted with a pump dispense that delivers a metered unit dose on actuation. Another preferred package is a moisture and air impermeable packet containing a unit dose. The contents inside the packet can be squeezed out so that they can be directly applied onto the male body surface.

As noted above, however, other formulations appropriate for the transdermal delivery of the two steroids NES and T described herein are possible. This transdermal delivery can be carried out by means of a transdermal patch, or by means of a transdermal spray, cream, ointment, aerosol, Metered Dose Transdermal System (MTDS), or other passive or active transdermal devices for absorption through the skin surface. In each of these cases, for each transdermal application of the composition in a unit dose form, the required amounts of NES and T, which are 8.3 mg of NES and 73.8 mg of T, respectively, sufficient to produce absorption of a daily dose of at least about 830 µg/day of NES and 7.38 mg/day of T are the critical factors in connection with this disclosure. Transdermal matrix patches delivering both NES and T in a surface of around 20 to 30 cm$^2$, delivering 830 µg/day of NES and 7.38 mg/day of T daily can also achieve such objectives. Those of ordinary skill thus are able to readily produce a corresponding patch, spray, ointment, aerosol or the like employing conventional systems with the specific active ingredients of the present disclosure therein.

According to one aspect to the present disclosure, it is provided a method for contraceptive treatment of males, and the method may comprise applying to a male body surface a transdermal composition comprising a combination of NES and T each in a pharmacologically effective amount, and a pharmaceutically acceptable excipient.

The transdermal composition used in such method is described as above. The transdermal composition in a unit dose form may be applied one to four times daily, at spaced intervals in a single day and over a period of days as needed. The dose level can be appreciated by one skilled person in the art. Preferably, the transdermal composition in a unit dose form may be applied once a day to provide an absorption rate of about 830 µg/day of NES and 7.38 mg/day of T to the body, and preferably applied once a day in a gel form having a volume of 1-10 mL, preferably 4-8 mL, and more preferably 5 mL.

The male body surface may include, but not limited to, abdomen, armpit, arm, back, thigh, and shoulder, preferably upper arm and shoulder.

As shown in the examples detailed below, a combined NES/T gel (8.3 mg/73.8 mg) in a unit dose form with a higher T concentration (73.8 mg) in a small volume (5 mL) per dose as disclosed in the present disclosure, when applied to the upper arms and shoulders of males once a day, resulted in effective suppression of gonadotropins to below 1.0 IU/L, and levels of serum NES were comparable to those targeted to suppress gonadotropins, e.g., a combined NES/T gel in a unit dose form in a concentration of 8.3 mg/62 mg in 5 mL of gel, similar to what was disclosed in Anawalt et al.

In addition, the sperm concentration study showed that the present transdermal composition in a unit dose form containing a higher T concentration (73.8 mg) in the combined NES/T gel (8.3 mg/73.8 mg) suppressed spermatogenesis faster, compared to the composition in a unit dose form containing a lower T concentration (62 mg) in the combined NES/T gel (8.3 mg/62 mg), the one used in Anawalt et al. For example, the suppression of spermatogenesis to less than 1.0 million/mL in the subjects treated with the present composition in a unit dose form comprising a combined NES/T gel in a concentration of 8.3 mg/73.8 mg occurred 8.9 days faster on average of the subjects and occurred 17.5 days faster in 25% of the subjects, compared to the use of the composition in a unit dose form comprising a combined NES/T gel in a concentration of 8.3 mg/62.5 mg.

Further, the subjects treated with the present transdermal composition containing a higher T concentration (73.8 mg) in the combined NES/T gel in a unit dose form (8.3 mg/73.8 mg) showed less side effects although the reverse might have been expected.

The addition of an appropriate dose of T to the achieved dose of NES would be a form of transdermal delivery for male contraceptive purpose with the above-discussed additional benefits.

EXAMPLES

Preparation of Low T and High T NES/T Gels

All the excipients used in the compositions are well-known substances, monographed in both the Ph. Eur. and USP/NF that are commonly and widely used in topical formulations.

A Low T concentration NES/T gel in a unit dose form was prepared with the components in Table 1:

TABLE 1

| Components | mg/dose (mg/5 mL gel) | mg/dose (mg/2.5 mL gel) | Function | % w/w |
|---|---|---|---|---|
| NESTORONE ® | 8.303 | 4.152 | Drug substance | 0.19 |
| Testosterone | 62.491 | 31.246 | Drug substance | 1.43 |
| ethanol, anhydrous, 200 Proof | 2968.54 | 1484.27 | Vehicle/ Penetration enhancer | 67.93 |
| Water, purified | 243.41 | 121.705 | Solvent for preparing ethanol aqueous solution | 5.575 |
| Carbopol 980 | 43.7 | 21.85 | Gel forming agent | 1.00 |
| Isopropyl myristate | 43.7 | 21.85 | Emollient/ Penetration enhancer | 1.00 |
| Sodium hydroxide, 0.1N solution | 305.9 | 152.95 | pH adjuster | 7.00 |
| Water, purified | 693.956 | 346.978 | Vehicle | q.s. (15.87) |
| Total | 4370 | 2185 | | 100 |

Such Low T NES/T gel comprised NES and T in 0.19% wt/wt and 1.43% wt/wt, respectively.

A High T concentration NES/T gel in a unit dose form was prepared with the components in Table 2:

TABLE 2

| Components | mg/dose (mg/5 mL gel) | mg/dose (mg/2.5 mL gel) | Function | % w/w |
|---|---|---|---|---|
| NESTORONE ® | 8.265 | 4.1325 | Drug substance | 0.19 |
| Testosterone | 73.82 | 36.91 | Drug substance | 1.697 |
| Ethanol, anhydrous, 200 Proof | 2954.96 | 1477.48 | Vehicle/ Penetration enhancer | 67.93 |
| Water, purified | 230.9 | 115.45 | Solvent for preparing ethanol aqueous solution | 5.308 |
| Carbopol 980 | 43.5 | 21.75 | Gel forming agent | 1.00 |
| Isopropyl myristate | 43.5 | 21.75 | Emollient/ Penetration enhancer | 1.00 |
| Sodium hydroxide, 0.1N solution | 304.72 | 152.36 | pH adjuster | 7.005 |
| Water, purified | 690.345 | 345.173 | Vehicle | q.s. (15.87) |
| Total | 4350 | 2175 | | 100 |

Such High T NES/T gel comprised NES and T in 0.19% wt/wt and 1.697% wt/wt, respectively.

Each NES/T gel was prepared by the following procedure. A 0.1N sodium hydroxide solution was prepared by dissolving sodium hydroxide in water. An ethanol aqueous solution was prepared by mixing ethanol and water, and to this ethanol solution was added isopropyl myristate. After isopropyl myristate was dissolved, NESTORONE® was added. The mixture was stirred until NESTORONE® was dissolved. Testosterone were added subsequently, and the resulting mixture was stirred until testosterone was dissolved. To this solution was added the remaining water and further mixed until it was visually uniform. Carbopol 980 was then added, and the mixture was stirred until it was fully hydrated. To this hydrated gel was added the previously prepared 0.1 N sodium hydroxide solution and mixed for completion of NES/T gel bulk compounding.

Treatment with Low and High T NES/T Gels

Male subjects, who were in good health based on general and reproductive medical history, were selected, and randomly divided into Low T and High T groups for once-a-day application of Low T and High T NES/T gels containing Low T (NES 8.3 mg/T 62.5 mg in a unit dose form) and High T (NES 8.3 mg/T 73.8 mg in a unit dose form) concentrations, respectively, during the efficacy phase.

At the study enrollment visit, the male subjects were given sufficient supply of gel to last until their next visit. The gel was provided in metered pump canisters which contained enough for 30 doses/applications of the gel, adequate for 2 weeks. The pump canisters were brought back at each visit and weighed for accountability purposes on a central calibrated scale. The NES/T combined gel metered pump canister was designed for male subjects to actuate the pump one time to deliver 2.5 mL of the gel onto the palm of one hand and then gently rub gel on the skin of the opposite side upper arm and shoulder. The process was repeated using the other hand to apply on opposite arm and shoulder so that a total of 5 mL of gel was applied each day.

At the enrollment visit, the male subjects were also provided with detailed instructions on applying the gel through the metered pump canister. The first dose of the Low T/High T gel was applied at the enrollment visit under the direct observation of study staff. The day and time of the start of treatment was recorded in the source documentation.

Male daily study medication logs were provided to the male subjects for recording the day and time of the application of the gels, any changes experienced to the site of application, and any medications taken and/or medical problems noted by the male subject each week. These study medication logs were reviewed and collected at each visit. Medications and adverse events recorded by the male subjects were collected and recorded in the source documentation.

During the suppression phase, male subjects were applied the Low T/High T gel once a day but relied on another method of contraception during this period while sperm levels were being suppressed. During the efficacy phase, the couple did not use any other method of contraception but relied solely on the once-a-day application of Low T/High T gel by the male partner for prevention of pregnancy.

The Low T/High T gel was applied to the male subjects each morning according to the following protocol:

Gel should be applied to clean dry skin daily, at approximately the same time each day in the morning, usually after showering.

The pump canister cap should not be removed until the male participant is ready to use the gel.

The male participant should wash his hands and then push the pump to deliver the gel to his hand.

The male participant should depress the pump one time to deliver the appropriate amount of gel onto the palm of one hand and then gently rub gel on the skin of the opposite upper arm and shoulder, shown in the shaded area in the FIGURE. The process should be repeated using the other hand plus opposite upper arm and shoulder to complete the prescribed daily dose of gel.

Once a dose is missed, apply it immediately.

Once the application site is dry, the site should be covered with clothing.

Wash hands and wrists thoroughly with soap and water after every gel application.

Avoid fire, flames or smoking until the gel has dried.

The male research participant should avoid swimming or showering or washing the administration site for a minimum of 2 hours after application.

Clothing should be worn over the gel application area once the gel has dried, or a shower should be taken prior to close skin contact with women or children.

There should be a minimum of 8 hours between each application of gel.

Blood samples of the subjects were collected at every 4 weeks (28 days) of the treatment for pharmacokinetics and safety assessment including hormone assays (such as serum NES and T concentrations, safety lab tests (such as complete blood count, metabolic panel, cholesterol panel, and PSA), and semen analyses (such as sperm concentration). The subjects were also provided with a medication log for any observable side effects including headache, mood changes, and acne.

Total number of subjects that enrolled in the study and those who reached <=1 million sperm count and entered the efficacy phase were recorded in the following Table Y.

TABLE Y

|  | LOW T NES 8.3 mg/ T 62.5 mg | High T NES 8.3 mg/ T 73.8 mg |
|---|---|---|
| Total Number of Enrolled Subjects | 227 | 235 |
| Sperm Suppression <=1 million | 164 (72.2%) | 192 (81.7%) |
| Enter Efficacy | 143 (63.0%) | 172 (73.2) |

Table Y shows the number of the subjects whose sperm suppression was <=1 million sperm counted at 72.2% of the enrolled subjects for the Low T concentration formulation, whereas the number of the subjects whose sperm suppression was <=1 million sperm counted at 81.7% for the High T concentration formulation, giving a difference of 9.5% from Low T to High T concentration formulation. Further, the number of subjects that entered efficacy phase was 63.0% and 73.2% for Low T and High T concentration formulations, respectively. As sperm suppression is known to be directly related to NES concentration, the sperm suppression and entry to efficacy phase would have been expected to be independent of T concentration. However, Table Y shows clear differences in sperm suppression and entry into efficacy phase between Low T and High T concentration formulations. Superior performance of High T concentration formulation of this disclosure is highly unusual and unexpected.

For the qualified subjects in each Low T and High T groups, who had first sperm concentration of 1 million/ml or less on or before 17 weeks, the days spent from the enrollment to reach such low sperm concentration were recorded in the following Table 3:

TABLE 3

|  | LOW T NES 8.3 mg/ T 62.5 mg | High T NES 8.3 mg/ T 73.8 mg |
|---|---|---|
| Total Number of Subjects | 202 | 231 |
| Qualified Number of Subjects | 128 (63.4%) | 163 (70.6%) |
| Mean (days) | 63.1 | 54.2 |
| 25th Percentage (days) | 55.3 | 37.8 |

Table 3 shows the summary of the days from enrollment to the point of having first sperm suppression with concentration of <=1 million/mL in both Low T and High T groups. Among the qualified subjects, the suppression of sperm production to <=1 mil/mL occurred 8.9 days faster on average for the High T concentration formulation group, compared to the Low T concentration formulation group. Additionally, in 25% of the subjects, the suppression of sperm production to <=1 mil/mL occurred 17.5 days faster for the High T concentration formulation group, compared to the Low T concentration formulation group.

It has been found that the suppression of LH, FSH, and sperm production was achieved through NESTORONE®. In both Low T and High T concentration formulations, the NESTORONE® concentration remained unchanged. Thus, it would have been expected that the rate of achieving sperm suppression would be identical. The observation of achieving faster sperm suppression for the High T concentration formulation in a NES 8.3 mg/T 73.8 mg gel was highly unexpected.

The side effects for the subjects in each Low T and High T groups were summarized in the following Table 4:

TABLE 4

| | LOW T NES 8.3 mg/ T 62.5 mg | High T NES 8.3 mg/ T 73.8 mg |
|---|---|---|
| Total Number of Subjects | 210 | 239 |
| Total Number of Subjects with at Least One AE* | 193 (91.9%) | 206 (86.2%) |
| Nervous system disorders^ | 66 (31.4%) | 37 (15.5%) |
| Headache | 45 (21.4%) | 30 (12.6%) |
| Psychiatric disorders^ | 96 (45.7%) | 68 (28.5%) |
| Mood altered | 26 (12.4%) | 4 (1.7%) |
| Skin and subcutaneous tissue disorder^ | 83 (39.5%) | 62 (25.9%) |
| Acne | 37 (17.6%) | 24 (10.0%) |

*Adverse events (AEs) are coded by using the Medical Dictionary for Regulatory Activities (MedDRA) Version 21.0.
^Only one major AE associate with disorders is presented.

Table 4 shows the highly unexpected lower occurrences of number of AEs for the High T concentration formulation group, compared to the Low T concentration formulation group. In the Low T group, 91.9% of the subjects reported at least one AE while only 86.2% of the subjects in High T group reported. Table 4 above also shows the subset of all the disorders/categories as defined by Medical Dictionary of Regulatory Activities. The High T formulation with the increased T concentration would have been expected to give more AEs; however, incidence of AEs related to hormonal increase of T concentration such as headache, altered mood and acne was greatly impacted with a decrease in number of AEs for the High T formulation. Among these, the highly unexpected outcome from this data was exemplified by less incidences of acne for High T group, compared to Low T group. In addition, there appeared to be a lower rate of discontinuation from the study in the High T group.

Ilani et al. (2012) reported that when 100 mg of T was used, the most common adverse event was acne, and occurred in 21% of subjects. Anawalt et al. (2019) disclosed using a lower dose of T (62.5 mg) to reduce and minimize androgenic acne. It would have been expected that such lower dose of T should decrease incidences of acne. Indeed, Table 4 above shows treating with 62.5 mg of T in a NES 8.3 mg/T 62.5 mg gel caused 17.6% of subjects in developing acne. More surprisingly, the present inventors found that using a High T concentration formulation in a NES 8.3 mg/T 73.8 mg gel, however, reduced the occurrence of acne to greater extent. High T group showed only 10% incidence of acne whereas Low T group showed 17.6% incidence of acne. For one of ordinary skill in the art, this was completely opposite to what was expected, that is that addition of T would be expected to increase acne.

INDUSTRIAL APPLICABILITY

The present disclosure provides a composition for the contraceptive treatment of males. The specific compositions and amounts thereof can provide a transdermal product, preferably in the form of a gel, which can be readily and advantageously applied to a male body surface in order to achieve effective and reversible contraceptive outcome.

The invention claimed is:

1. A transdermal composition in a unit dose form for contraceptive treatment of males, comprising 16-methylene-17α-acetoxy-19-norpregn-4-ene-3,20-dione in the amount of 8.3 mg, testosterone in the amount of 73.8 mg, and a pharmaceutical acceptable excipient.

2. The transdermal composition in a unit dose form according to claim 1, wherein the transdermal composition is in a gel form.

3. The transdermal composition in a unit dose form according to claim 2, wherein the transdermal composition in the gel form is a hydroalcoholic gel comprising a $C_2$ to $C_4$ alcohol.

4. The transdermal composition in a unit dose form according to claim 3, wherein the $C_2$ to $C_4$ alcohol is ethanol.

5. The transdermal composition in a unit dose form according to claim 3, wherein the $C_2$ to $C_4$ alcohol is included in an amount of 50% to 85% wt/wt.

6. The transdermal composition in a unit dose form according to claim 1, wherein the excipient comprises a penetration enhancer.

7. The transdermal composition in a unit dose form according to claim 6, wherein the penetration enhancer is isopropyl myristate.

8. A method for contraceptive treatment of a man, comprising applying to a human male body surface the transdermal composition in a unit dose form according to claim 1.

9. The method for contraceptive treatment of males according to claim 8, wherein the transdermal composition in a unit dose form is applied to the human male body surface once a day.

10. The method for contraceptive treatment of males according to claim 8, wherein the transdermal composition is in a gel form.

* * * * *